(12) United States Patent
Komuro et al.

(10) Patent No.: US 10,703,887 B2
(45) Date of Patent: *Jul. 7, 2020

(54) RESIN COMPOSITION, FILM PRODUCED BY USING THE RESIN COMPOSITION, AND MULTILAYER STRUCTURE

(71) Applicant: THE NIPPON SYNTHETIC CHEMICAL INDUSTRY CO., LTD., Osaka (JP)

(72) Inventors: Ryohei Komuro, Osaka (JP); Shouichi Kani, Osaka (JP)

(73) Assignee: MITSUBISHI CHEMICAL CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/576,469

(22) PCT Filed: Jun. 8, 2016

(86) PCT No.: PCT/JP2016/067129
§ 371 (c)(1),
(2) Date: Nov. 22, 2017

(87) PCT Pub. No.: WO2016/199827
PCT Pub. Date: Dec. 15, 2016

(65) Prior Publication Data
US 2018/0208750 A1 Jul. 26, 2018

(30) Foreign Application Priority Data

Jun. 12, 2015 (JP) .................................. 2015-119112

(51) Int. Cl.
| | | |
|---|---|---|
| C08L 23/08 | (2006.01) | |
| C08J 5/18 | (2006.01) | |
| C08L 29/04 | (2006.01) | |
| B29B 9/12 | (2006.01) | |
| B32B 27/28 | (2006.01) | |
| B32B 27/30 | (2006.01) | |
| C08K 5/101 | (2006.01) | |
| C08K 5/00 | (2006.01) | |
| B29B 9/06 | (2006.01) | |

(52) U.S. Cl.
CPC ............ *C08L 23/0861* (2013.01); *B29B 9/12* (2013.01); *B32B 27/28* (2013.01); *B32B 27/306* (2013.01); *C08J 5/18* (2013.01); *C08K 5/101* (2013.01); *C08L 29/04* (2013.01); *B29B 9/06* (2013.01); *C08K 5/005* (2013.01); *C08L 2203/16* (2013.01)

(58) Field of Classification Search
CPC .......... B32B 27/28; B32B 27/306; C08J 5/18; C08K 5/101; C08K 5/12; C08L 2203/16; C08L 23/0861; C08L 29/04
See application file for complete search history.

(56) References Cited

U.S. PATENT DOCUMENTS

| 5,821,292 | A | 10/1998 | Aumueller et al. | |
|---|---|---|---|---|
| 6,087,433 | A * | 7/2000 | Hanada ................ | C08K 3/34 524/492 |
| 6,492,442 | B1 | 12/2002 | Appel et al. | |
| 2002/0176953 | A1 | 11/2002 | Tsai et al. | |
| 2005/0004275 | A1 | 1/2005 | Heidenfelder et al. | |
| 2005/0090591 | A1 | 4/2005 | Heidenfelder et al. | |
| 2005/0107507 | A1 | 5/2005 | Ikeda et al. | |
| 2010/0028580 | A1 | 2/2010 | Palmer et al. | |

FOREIGN PATENT DOCUMENTS

| CN | 1168683 | | 12/1997 |
|---|---|---|---|
| CN | 101768315 | | 7/2010 |
| JP | S51-132259 | A | 11/1976 |
| JP | S63-69867 | A | 3/1988 |
| JP | H01-221446 | A | 9/1989 |
| JP | 5-262834 | | 10/1993 |
| JP | H09-300554 | A | 11/1997 |
| JP | H10-508642 | A | 8/1998 |
| JP | 2001-139943 | A | 5/2001 |
| JP | 2005-511882 | A | 4/2005 |
| JP | 2005-511883 | A | 4/2005 |
| JP | 2011-529988 | A | 12/2011 |

OTHER PUBLICATIONS

International Preliminary Report on Patentability from Application No. PCT/JP2016/067129 dated Aug. 9, 2016.
International Search Report from Application No. PCT/JP2016/067129, dated Aug. 9, 2016.
CN OA issued for CN Application No. 201680032455.9 dated Sep. 3, 2019 with English translation.
JP OA issued for JP Application No. 2016-537582 dated Oct. 29, 2019 with English translation.
"Analysis Method and Application of Polymer Materials" p. 360 (Shanghai Scientific & Technical Publishers, Jan. 31, 2009) with English translation.

* cited by examiner

*Primary Examiner* — Frances Tischler
(74) *Attorney, Agent, or Firm* — Greenblum & Bernstein, P.L.C.

(57) ABSTRACT

The present disclosure provides a resin composition which contains: (A) a saponified ethylene-vinyl ester copolymer; and (B) a cinnamate; wherein the cinnamate (B) is present in a proportion of 0.01 to 10 ppm based on the amount of the saponified ethylene-vinyl ester copolymer (A). Therefore, the use of the resin composition makes it possible to produce a film which is highly transparent, capable of absorbing ultraviolet radiation of a specific wavelength range (e.g., UV-B and UV-C having a wavelength shorter than 320 nm) and free from an odor problem and the like.

6 Claims, No Drawings

RESIN COMPOSITION, FILM PRODUCED BY USING THE RESIN COMPOSITION, AND MULTILAYER STRUCTURE

TECHNICAL FIELD

The present disclosure relates to a resin composition containing a saponified ethylene-vinyl ester copolymer (hereinafter sometimes referred to as "EVOH"), a film produced by using the resin composition, and a multilayer structure. More specifically, the disclosure relates to a film which is transparent, excellent in UV absorbability and long-term light resistance, and substantially free from emanation of odor, and a multilayer structure including a layer of the resin composition.

BACKGROUND ART

EVOH generally has higher crystallinity because of its very strong intermolecular forces due to hydrogen bonds between hydroxyl groups present at its side chains. Further, a film containing EVOH prevents transmission of gas molecules because the inter-molecular forces are strong even in an amorphous part of the EVOH. For this reason, the EVOH-containing film is generally excellent in gas barrier property. Therefore, EVOH is conventionally widely used for a packaging material because of its excellent gas barrier property and higher transparency.

An example of packaging material is a multilayer film structure which includes an intermediate layer of EVOH-containing film, and inner and outer layers of a thermoplastic resin respectively provided on opposite sides of the EVOH-containing film layer. The multilayer structure is formed into a film, a sheet or a container such as a bottle for a food packaging material, a medicine packaging material, an industrial chemical packaging material, an agricultural packaging material and other packaging material with advantageous use of its excellent gas barrier property and transparency.

However, the multilayer structure, which is highly transparent, transmits not only visible light but also ultraviolet radiation, so that a product contained in the packaging material is problematically liable to be deteriorated by the ultraviolet radiation. Particularly, it is known that, where the multilayer structure is used as food packaging material, food contained in the packaging material is exposed to ultraviolet radiation of a wavelength range of shorter than 320 nm such as UV-B and UV-C and, as a result, is significantly deteriorated. To cope with this, it is proposed to add a water-soluble UV absorber to a film of a resin such as a polyvinyl alcohol having a gas barrier property to thereby impart the resin film with a higher transparency and prevent the photodegradation of the contained product due to the transmitted ultraviolet radiation (see, for example, PTL 1).

RELATED ART DOCUMENT

Patent Document

PTL 1: JP-A-SH051(1976)-132259

SUMMARY OF INVENTION

In the art disclosed in PTL 1, however, the UV absorber is liable to bleed out on the resin film during a prolonged use of the resin film as the packaging material. This may problematically result in the deterioration of appearance and the emanation of odor. Therefore, further improvement is required.

In view of the foregoing, it is an object to provide a resin composition to be used for forming a film which is highly transparent, capable of absorbing ultraviolet radiation of a specific wavelength range (e.g., UV-B and UV-C having a wavelength shorter than 320 nm) and free from an odor problem and the like, and to provide a film formed by using the resin composition and a multilayer structure.

In view of the foregoing, the inventors conducted intensive studies and, as a result, found that, where a cinnamate (B) is used in a predetermined proportion (0.01 to 10 ppm) in combination with an EVOH (A) having excellent gas barrier property and higher transparency, it is possible to provide a resin composition which maintains excellent properties of the EVOH (A) and is capable of absorbing ultraviolet radiation of specific wavelength range and substantially free from deterioration of appearance due to the bleeding and the emanation of odor.

According to a first inventive aspect, there is provided a resin composition which contains: (A) an EVOH; and (B) a cinnamate; wherein the cinnamate (B) is present in a proportion of 0.01 to 10 ppm based on the amount of the EVOH (A).

In the resin composition, the cinnamate (B) may be methyl cinnamate.

According to a second inventive aspect, there is provided a film which is formed by using the resin composition. According to a third inventive aspect, there is provided a multilayer structure which includes at least one resin composition layer made of the resin composition.

According to the present invention, the resin composition contains EVOH (A) and cinnamate (B), and the proportion of the cinnamate (B) is 0.01 to 10 ppm based on the amount of the EVOH (A). The film formed by using the resin composition is highly transparent, capable of absorbing ultraviolet radiation of the specific wavelength range (e.g., UV-B and UV-C having a wavelength of shorter than 320 nm), free from the bleeding, excellent in long-term light resistance, and substantially free from the emanation of odor.

Where the cinnamate (B) is methyl cinnamate, the resin composition is easy to handle and excellent in heat stability.

DESCRIPTION OF EMBODIMENTS

The present disclosure will be described in detail by way of a preferred embodiment.

A resin composition according to this embodiment contains: (A) an EVOH; and (B) a cinnamate. In the resin composition, cinnamate (B) is present in a predetermined proportion based on the amount of the EVOH (A).

<EVOH (A)>

The EVOH (A) to be used in the present disclosure will be described.

The EVOH (A) to be used in the present disclosure is a water-insoluble thermoplastic resin typically prepared by copolymerizing ethylene and a vinyl ester monomer and saponifying the resulting copolymer. A known polymerization method such as solution polymerization, suspension polymerization or emulsion polymerization may be utilized for the copolymerization. In general, a solution polymerization method using methanol as a solvent is utilized. The saponification of the resulting ethylene-vinyl ester copolymer may be achieved by a known method.

The EVOH (A) to be used in the present disclosure mainly contains an ethylene structural unit and a vinyl alcohol structural unit, and further contains a small amount of a vinyl ester structural unit left unsaponified.

Typically, vinyl acetate is used as the vinyl ester monomer because of its commercial availability and its higher impurity removal efficiency in the preparation. Other examples of the vinyl ester monomer include: aliphatic vinyl esters such as vinyl formate, vinyl propionate, vinyl valerate, vinyl butyrate, vinyl isobutyrate, vinyl pivalate, vinyl caprate, vinyl laurate, vinyl stearate and vinyl versatate; and aromatic vinyl esters such as vinyl benzoate. The aliphatic vinyl esters typically have a carbon number of 3 to 20, preferably 4 to 10, particularly preferably 4 to 7. These vinyl ester monomers may be typically each used alone but, as required, may be used in combination.

The EVOH (A) typically has an ethylene structural unit content of 20 to 60 mol %, preferably 25 to 50 mol %, particularly preferably 25 to 35 mol %, as measured in conformity with ISO14663. If the ethylene structural unit content is excessively low, the EVOH tends to be poorer in high-humidity gas barrier property and melt-formability. If the ethylene structural unit content is excessively high, on the other hand, the EVOH tends to be poorer in gas barrier property.

The saponification degree of the vinyl ester in the EVOH (A) is typically 90 to 100 mol %, preferably 95 to 100 mol %, particularly preferably 99 to 100 mol %, as measured in conformity with JIS K6726 (by using a solution of the EVOH (A) prepared by homogeneously dissolving the EVOH (A) in a water/methanol solvent). If the saponification degree is excessively low, the EVOH tends to be poorer in gas barrier property, heat stability, moisture resistance and the like.

The EVOH (A) typically has a melt flow rate (MFR) of 0.5 to 100 g/10 minutes, preferably 1 to 50 g/10 minutes, particularly preferably 3 to 35 g/10 minutes, as measured at 210° C. with a load of 2160 g. If the MFR is excessively high, the EVOH tends to be poorer in film formability. If the MFR is excessively low, the EVOH tends to be difficult to melt-extrude.

The EVOH (A) to be used in the present disclosure may further contain a structural unit derived from any of the following comonomers (e.g., in a proportion of not greater than 10 mol %) as long as the effects of the present disclosure are not impaired.

The comonomers include: olefins such as propylene, 1-butene and isobutene; hydroxyl-containing α-olefins such as 2-propene-1-ol, 3-butene-1-ol, 4-pentene-1-ol, 5-hexene-1-ol, 3,4-dihydroxy-1-butene and 5-hexene-1,2-diol, and esterification products, acylation products and other derivatives of these hydroxyl-containing α-olefins such as 3,4-diacyloxy-1-butene (particularly, 3,4-diacetoxy-1-butene), 2,3-diacetoxy-1-allyloxypropane, 2-acetoxy-1-allyloxy-3-hydroxypropane, 3-acetoxy-1-allyloxy-2-hydroxypropane, glycerin monovinyl ether and glycerin monoisopropenyl ether; unsaturated acids such as acrylic acid, methacrylic acid, crotonic acid, phthalic acid (anhydride), maleic acid (anhydride) and itaconic acid (anhydride), salts of these unsaturated acids, and monoalkyl and dialkyl esters of these unsaturated acids having a carbon number of 1 to 18; acrylamides such as acrylamide, N-alkyl acrylamides having a carbon number of 1 to 18, N,N-dimethyl acrylamide, 2-acrylamidopropane sulfonic acid and salts thereof, and acrylamidopropyldimethylamine and acid salts and quaternary salts thereof; methacrylamides such as methacrylamide, N-alkyl methacrylamides having a carbon number of 1 to 18, N,N-dimethyl methacrylamide, 2-methacrylamidopropane sulfonic acid and salts thereof, and methacrylamidopropyldimethylamine and acid salts and quaternary salts thereof; N-vinylamides such as N-vinylpyrrolidone, N-vinylformamide and N-vinylacetamide; vinyl cyanates such as acrylonitrile and methacrylonitrile; vinyl ethers such as alkyl vinyl ethers, hydroxyalkyl vinyl ethers and alkoxyalkyl vinyl ethers having a carbon number of 1 to 18; halogenated vinyl compounds such as vinyl chloride, vinylidene chloride, vinyl fluoride, vinylidene fluoride and vinyl bromide; vinylsilanes such as trimethoxyvinylsilane; allyl acetate and halogenated allyl compounds such as allyl chloride; allyl alcohols such as allyl alcohol and dimethoxyallyl alcohol; and trimethyl(3-acrylamido-3-dimethylpropyl)ammonium chloride and acrylamido-2-methylpropane sulfonic acid.

Post-modified EVOHs such as a urethanized EVOH, an acetalized EVOH, a cyanoethylated EVOH and an oxyalkylenated EVOH are also usable.

Particularly, an EVOH prepared by the copolymerization with a hydroxyl-containing α-olefin is preferred because of its excellent secondary formability. Of EVOHs having a primary hydroxyl group at its side chain, an EVOH having 1,2-diol at its side chain is particularly preferred.

The EVOH having 1,2-diol at its side chain contains a 1,2-diol structural unit at its side chain. More specifically, the 1,2-diol structural unit is a structural unit represented by the following general formula (1):

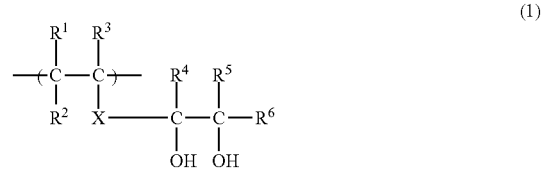

wherein $R^1$, $R^2$ and $R^3$ are each independently a hydrogen atom or an organic group, X is a single bond or a bonding chain, and $R^4$, $R^5$ and $R^6$ are each independently a hydrogen atom or an organic group.

Examples of the organic group in the 1,2-diol structural unit represented by the above general formula (1) include saturated hydrocarbon groups such as a methyl group, an ethyl group, a n-propyl group, an isopropyl group, a n-butyl group, an isobutyl group and a tert-butyl group, aromatic hydrocarbon groups such as a phenyl group and a benzyl group, halogen atoms, a hydroxyl group, acyloxy groups, alkoxycarbonyl groups, a carboxyl group and a sulfonic acid group.

Particularly, $R^1$ to $R^3$ in the formula (1) are each typically a saturated hydrocarbon group having a carbon number of 1 to 30, particularly 1 to 15, more preferably 1 to 4, or the hydrogen atom, most preferably the hydrogen atom. Further, $R^4$ to $R^6$ in the formula (1) are each typically an alkyl group having a carbon number of 1 to 30, particularly 1 to 15, more preferably 1 to 4, or the hydrogen atom, most preferably the hydrogen atom. Particularly, it is most preferred that $R^1$ to $R^6$ are all hydrogen atoms.

In the structural unit represented by the general formula (1), X is typically a single bond.

As long as the effects of the present disclosure are not impaired, X may be a bonding chain. Examples of the bonding chain include: hydrocarbon chains such as alkylenes, alkenylenes, alkynylenes, phenylene and naphthylene (which may be substituted with a halogen such as fluorine, chlorine or bromine); ether bond-containing structures such as —O—, —(CH$_2$O)$_m$—, —(OCH$_2$)$_m$— and —(CH$_2$O)$_m$CH$_2$—; carbonyl-containing structures such as —CO—, —COCO—, —CO(CH$_2$)$_m$CO— and —CO(C$_6$H$_4$)CO—; heteroatom-containing structures including sulfur atom-containing structures such as —S—, —CS—, —SO— and —SO$_2$—, nitrogen atom-containing structures such as —NR—, —CONR—, —NRCO—, —CSNR—, —NRCS— and —NRNR—, and phosphorus atom-containing structures such as —HPO$_4$—; and metal atom-containing structures including silicon atom-containing structures such as —Si(OR)$_2$—, —OSi(OR)$_2$— and —OSi(OR)$_2$O—, titanium atom-containing structures such as —Ti(OR)$_2$—, —OTi(OR)$_2$— and —OTi(OR)$_2$O—, and aluminum atom-containing structures such as —Al(OR)—, —OA(OR)— and —OAl(OR)O—, wherein Rs are each independently a given substituent, preferably a hydrogen atom or an alkyl atom, and m is a natural number, typically 1 to 30, preferably 1 to 15, more preferably 1 to 10. Of these bonding chains, —CH$_2$OCH$_2$— or a hydrocarbon chain having a carbon number of 1 to 10 is preferred in terms of stability during production or during use. A hydrocarbon chain having a carbon number of 1 to 6 is further preferred. A hydrocarbon chain having a carbon number of 1 is particularly preferred.

In the 1,2-diol structural unit represented by the above general formula (1), it is most preferred that R$^1$ to R$^6$ are all hydrogen atoms and X is a single bond. That is, a structural unit represented by the following general formula (1a) is most preferred.

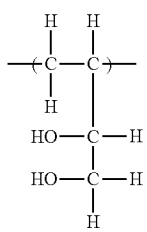

(1a)

Particularly, where the 1,2-diol structural unit represented by the above general formula (1) is contained, the content of the 1,2-diol structural unit is typically 0.1 to 20 mol %, preferably 0.1 to 15 mol %, particularly preferably 0.1 to 10 mol %.

The EVOH (A) to be used in the present disclosure may be a mixture of the EVOH (A) and a different type of EVOH. The different type of EVOH may have a different content of the ethylene structural unit, a different content of the 1,2-diol structural unit represented by the general formula (1), a different saponification degree or a different melt flow rate (MFR), or may contain a different comonomer.

Additives which are generally blended with the EVOH may be further blended with the EVOH (A) to be used in the present disclosure, as long as the effects of the present disclosure are not impaired. Examples of the additives include a heat stabilizer, an antioxidant, an antistatic agent, a colorant, a UV absorber, a lubricant, a plasticizer, a light stabilizer, a surfactant, an antibacterial agent, a desiccant, an antiblocking agent, a flame retarder, a crosslinking agent, a curing agent, a foaming agent, a crystal nucleating agent, an antifogging agent, a biodegradation additive, a silane coupling agent and an oxygen absorber.

The heat stabilizer is blended for improvement of heat stability and other physical properties of the resin composition in a melt-forming process. Examples of the heat stabilizer include: organic acids such as acetic acid, propionic acid, butyric acid, lauric acid, stearic acid, oleic acid and behenic acid, and alkali metal salts (sodium, potassium and like salts), alkali earth metal salts (calcium, magnesium and like salts) and zinc salts of these organic acids; and inorganic acids such as sulfuric acid, sulfurous acid, carbonic acid, phosphoric acid and boric acid, and alkali metals salts (sodium, potassium and like salts), alkali earth metal salts (calcium, magnesium and like salts) and zinc salts of these inorganic acids.

Of these heat stabilizers, any of acetic acid, boric acid, boron compounds including borates, acetates and phosphates is preferably blended with the EVOH (A).

Where acetic acid is blended with the EVOH (A), the proportion of acetic acid is typically 0.001 to 1 part by weight, preferably 0.005 to 0.2 parts by weight, particularly preferably 0.01 to 0.1 part by weight, based on 100 parts by weight of the EVOH (A). If the proportion of acetic acid is excessively small, it will be impossible to sufficiently provide the effects of the blending of acetic acid. If the proportion of acetic acid is excessively great, on the other hand, it will be difficult to provide a uniform film.

Where the boron compound is blended with the EVOH (A), the proportion of the boron compound is typically 0.001 to 1 part by weight, preferably 0.002 to 0.2 parts by weight, particularly preferably 0.005 to 0.1 part by weight, based on 100 parts by weight of the EVOH (A) as measured on a boron basis (through analysis by ICP emission spectrometry after ashing). If the proportion of the boron compound is excessively small, it will be impossible to sufficiently provide the effects of the blending of the boron compound. If the proportion of the boron compound is excessively great, on the other hand, it will be difficult to provide a uniform film.

Where an acetate or a phosphate (or a hydrogen phosphate) is blended with the EVOH (A), the proportion of the acetate or the phosphate is typically 0.0005 to 0.1 part by weight, preferably 0.001 to 0.05 parts by weight, particularly preferably 0.002 to 0.03 parts by weight, based on 100 parts by weight of the EVOH (A) as measured on a metal basis (through analysis by ICP emission spectrometry after ashing). If the proportion of the acetate or the phosphate is excessively small, it will be impossible to sufficiently provide the effects of the blending. If the proportion of the acetate or the phosphate is excessively great, on the other hand, it will be difficult to provide a uniform film. Where two or more types of acetates and/or phosphates are blended with the EVOH (A), the total proportion of the acetates and/or the phosphates preferably falls within the aforementioned range.

Exemplary methods for blending the heat stabilizer (e.g., any of acetic acid, the boron compounds, the acetates and the phosphates) with the EVOH (A) include: i) a method in which a porous deposition product of the EVOH (A) having a moisture content of 20 to 80 wt. % is brought into contact with an aqueous solution of the additive to be thereby impregnated with the aqueous solution and then dried; ii) a method in which the additive is blended with a homogeneous solution (a water/alcohol solution or the like) of the EVOH (A) and then the resulting mixture is extruded in a coagulation liquid into strands which are in turn cut into pellets and dried; iii) a method in which the EVOH (A) and the additive are mixed together and the resulting mixture is melt-kneaded by an extruder or the like; and iv) a method in which alkali (sodium hydroxide, potassium hydroxide or the like) used for the saponification in the production of the EVOH (A) is neutralized with an organic acid such as acetic acid, and the amount of the remaining organic acid (acetic acid) and the amount of a salt produced by a side reaction are controlled by rinsing with water.

For more remarkable effects of the present disclosure, the method i) or ii) is preferred, which ensures excellent dispersion of the additive. Where an organic acid or a salt thereof is to be blended, the method iv) is preferred.

<Cinnamate (B)>

The cinnamate (B) to be used in the present disclosure has an ultraviolet radiation absorbing ability. Examples of the cinnamate include alkyl cinnamates such as methyl cinnamate, ethyl cinnamate, n-propyl cinnamate, isopropyl cinnamate, n-butyl cinnamate and isobutyl cinnamate, among which alkyl cinnamates including a C1 to C4 alkyl group are particularly preferred. These cinnamates may be used alone or in combination. Particularly, methyl cinnamate, ethyl cinnamate, n-propyl cinnamate and isopropyl cinnamate are preferred, which have higher heat resistance and have UV absorbing effect even at a higher temperature such as during the melt-forming process. Especially, methyl cinnamate is preferably used because it is excellent in heat stability and is solid at a room temperature (25° C.) and hence easy to handle.

The proportion of the cinnamate (B) is 0.01 to 10 ppm, preferably 0.1 to 8 ppm, more preferably 0.15 to 5 ppm, based on the amount of the EVOH (A). If the proportion of the cinnamate (B) is excessively small, the UV absorbing effect will be reduced. If the proportion of the cinnamate (B) is excessively great, it will be impossible to provide the odor suppressing effect.

In the present disclosure, where the resin composition contains the EVOH (A) and methyl cinnamate, the proportion of methyl cinnamate is 0.01 to 10 ppm based on the amount of the EVOH (A). If the proportion of methyl cinnamate is excessively small, the UV absorbing effect will be reduced. If the proportion of methyl cinnamate is excessively great, it will be impossible to provide the odor suppressing effect.

<Other Thermoplastic Resin (C)>

According to the present disclosure, the resin composition may contain an additional thermoplastic resin (C) other than the EVOH (A) as a resin component, typically, in a proportion of not greater than 30 wt. % based on the weight of the EVOH (A).

Specific examples of the other thermoplastic resin (C) include polyolefin homopolymers and polyolefin copolymers such as linear low-density polyethylenes, low-density polyethylenes, medium-density polyethylenes and high-density polyethylenes, ethylene-vinyl acetate copolymers, ionomers, ethylene-propylene copolymers, ethylene-α-olefin (C4 to C20 α-olefin) copolymers, ethylene-acrylate copolymers, polypropylenes, propylene-α-olefin (C4 to C20 α-olefin) copolymers, polybutenes and polypentenes, polycycloolefins, and polyolefin resins in a broader sense such as obtained by graft-modifying any of these olefin homopolymers and olefin copolymers with an unsaturated carboxylic acid or an unsaturated carboxylate, polystyrene resins, polyesters, polyamides, polyamide copolymers, polyvinyl chlorides, polyvinylidene chlorides, acryl resins, vinyl ester resins, polyester elastomers, polyurethane elastomers, chlorinated polyethylenes and chlorinated polypropylenes.

Particularly, where a multilayer structure is to be produced for use as a food packaging material by employing the inventive resin composition, it is preferred to blend a polyamide resin in order to prevent the EVOH from leaching from an edge of the packaging material after hot water treatment of the packaging material. The polyamide resin can form a network structure with its amide bonds interacting with OH groups and/or ester groups of the EVOH (A), thereby preventing the leaching of the EVOH (A) in the hot water treatment. Therefore, where the inventive resin composition is used for a packaging material for retort food or boilable food, it is preferred to blend the polyamide resin with the EVOH (A).

Known polyamide resins are usable as the polyamide resin.

Specific examples of the polyamide resins include: polyamide homopolymers such as polycapramide (nylon 6), poly-ω-aminoheptanoic acid (nylon 7), poly-ω-aminononanoic acid (nylon 9), polyundecanamide (nylon 11) and polylauryllactam (nylon 12); polyamide copolymer resins including aliphatic polyamides such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), ethylenediamine adipamide/hexamethylenediammonium adipate copolymers (nylon 26/66), caprolactam/hexamethylenediammonium adipate/hexamethylenediammoniumsebacate copolymers (nylon 66/610) and ethyleneammonium adipate/hexamethylenediammonium adipate/hexamethylenediammoniumsebacate copolymers (nylon 6/66/610), and aromatic polyamides such as polyhexamethylene isophthalamide, polyhexamethylene terephthalamide, poly-m-xylene adipamide, hexamethylene isophthalamide/terephthalamide copolymers, poly-p-phenylene terephthalamide, poly-p-phenylene/3,4'-diphenyl ether terephthalamide; amorphous polyamides, polyamide resins obtained by modifying any of these polyamide resins with an aromatic amine such as methylenebenzylamine or m-xylenediamine, or m-xylylenediammonium adipate. These polyamide resins may be terminal-modified. A polyamide resin obtained by terminal-modifying any of these polyamide resins is preferred. These polyamide resins may be used alone or in combination.

Specifically, the terminal-modified polyamide resins are polyamide resins obtained by terminal-modification with a C1 to C22 hydrocarbon group, and commercially available ones may be used. More specifically, it is preferred to use a terminal-modified polyamide resin which satisfies the following expression: $100 \times Y/(X+Y) \geq 5$
wherein X is the number of terminal COOH groups of the terminal-modified polyamide resin, and Y is the number of terminal $CONR^1R^2$ groups of the terminal-modified polyamide resin (wherein $R^1$ is a C1 to C22 hydrocarbon group, and $R^2$ is a hydrogen atom or a C1 to C22 hydrocarbon group).

The terminal-modified polyamide resin is such that carboxyl groups of an ordinary unmodified polyamide resin are modified into N-substituted amides with a terminal controlling agent and the number of the modified carboxyl groups accounts for not less than 5% of the total number of the carboxyl groups of the unmodified polyamide resin. If the number of the modified carboxyl groups is excessively small, a greater number of carboxyl groups are left unmodified in the polyamide resin. The unmodified carboxyl groups are liable to react with the EVOH (A) in the melt-forming process to cause gelation, so that the resulting film tends to have poorer appearance. The terminal-modified polyamide resin may be produced by a method described, for example, in JP-B2-HEI8(1996)-19302.

Usable as the terminal controlling agent is an amine which is reactive with carboxyl groups to reduce the number of the carboxyl groups present in the polyamide resin. The amine may be a mono-substituted amine represented by $HNR^1R^2$ (wherein $R^2$ is a hydrogen atom) or a di-substituted amine represented by $HNR^1R^2$. Where at least one of $R^1$ and $R^2$ of $HNR^1R^2$ is an organic group, $R^1$ and $R^2$ are each preferably a hydrocarbon group having no carboxyl group, and may include other functional group such as a hydroxyl group, an amino group or a carbonyl group, as long as the effects of the present disclosure are not impaired. $R^1$ and $R^2$ are each preferably an aliphatic hydrocarbon group. More specifically, $R^1$ and $R^2$, which may be the same or different, are each preferably a C1 to C22 hydrocarbon group, preferably a C5 to C20 hydrocarbon group.

The amount of the unmodified terminal carboxyl groups present in the terminal-modified polyamide resin is preferably small. The amount (mol equivalent per 1 g of polymer) of the unmodified carboxyl groups is typically 0 to 50 µeq/1 g polymer, preferably 0 to 30 µeq/1 g polymer, particularly preferably 0 to 25 µeq/1 g polymer, as determined by dissolving the polyamide in benzyl alcohol and titrating the resulting polyamide solution with a 0.1 N sodium hydroxide aqueous solution. If this value is excessively great, the gelation is liable to occur in the film forming process, so that the resulting film tends to be poorer in appearance and retorting property. Even if the value is excessively small, the resulting film has no inconvenience in physical properties, but the productivity tends to be reduced. Therefore, the terminal carboxyl groups may be left unmodified to some extent. In this case, the amount of the unmodified carboxyl groups is typically 5 to 50 µeq/1 g polymer, desirably 10 to 30 µeq/1 g polymer, particularly desirably 15 to 25 µeq/1 g polymer.

Like the terminal carboxyl groups, the terminal $NH_2$ groups of the unmodified polyamide resin are preferably modified with a C1 to C22 hydrocarbon group. Therefore, a terminal controlling agent to be used is preferably a carboxylic acid which is reactive with the amino groups to reduce the amount of the amino groups present in the polyamide resin. More specifically, a monocarboxylic acid represented by RCOOH (wherein R is a C1 to C22 hydrocarbon group) is used.

The terminal-modified polyamide resin typically has a melting point of 200° C. to 250° C., preferably 200° C. to 230° C.

Where the polyamide resin is used as the other thermoplastic resin (C), the weight ratio between the EVOH (A) and the polyamide resin (C) is typically 99/1 to 70/30, preferably 97/3 to 75/25, particularly preferably 95/5 to 85/15. If the weight ratio of the polyamide resin (C) is excessively great, the resin composition tends to be poorer in long-run formability and gas barrier property. If the weight ratio of the polyamide resin (C) is excessively small, the effect of the blending of the polyamide resin (C) for suppressing the leaching of the EVOH (A) after the hot water treatment tends to be insufficient.

<Inorganic Filler (D)>

For improvement of the gas barrier property, the inventive resin composition may contain an inorganic filler (D) in addition to the EVOH (A) (as desired, the other thermoplastic resin (C)) and the cinnamate (B).

The inorganic filler (D) is preferably a platy inorganic filler for proper gas barrier property. Examples of the inorganic filler (D) include kaolin of platy particles mainly containing hydrous aluminum silicate, mica and smectite which are lamellar silicate minerals, and talc composed of magnesium hydroxide and silicate. Of these inorganic fillers, kaolin is preferably used. The kind of kaolin is not particularly limited. Kaolin may be fired or unfired, but fired kaolin is preferred.

The blending of the inorganic filler (D) further improves the gas barrier property of the resin composition. Particularly, the platy inorganic filler has a multilayer structure. Therefore, when the resin composition containing platy inorganic filler particles is formed into a film, planar surfaces of the platy inorganic filler particles are oriented along a surface of the film. Thus, it is supposed that the platy inorganic filler particles oriented along the surface particularly serve to prevent oxygen from transmitting through the resin composition layer (e.g., film).

The proportion of the inorganic filler (D) is typically 1 to 20 wt. %, preferably 3 to 18 wt. %, more preferably 5 to 15 wt. %, based on the weight of the EVOH (A). If the proportion of the inorganic filler (D) is excessively small, the gas barrier property improving effect will be reduced. If the proportion of the inorganic filler (D) is excessively great, the transparency will be reduced.

<Oxygen Absorber (E)>

For improvement of the gas barrier property after the hot water treatment (retorting process), the inventive resin composition may contain an oxygen absorber (E) in addition to the EVOH (A) (as desired, the other thermoplastic resin (C)) and the cinnamate (B).

The oxygen absorber (E) is a compound or a compound system which is capable of trapping oxygen more quickly than a product to be packaged with the packaging material. Specific examples of the oxygen absorber (E) include an inorganic oxygen absorber, an organic oxygen absorber, and a composite oxygen absorber containing an inorganic catalyst (transition metal catalyst) and an organic compound.

The inorganic oxygen absorber may be a metal or a metal compound which is reactive with oxygen to absorb oxygen. Preferred examples of the metal include metals having greater ionization tendencies than hydrogen (e.g., Fe, Zn, Mg, Al, K, Ca, Ni, Sn and the like), among which Fe is typical. These metals are preferably used in a powdery form. Conventionally known iron powder such as produced by reduction, atomization or electrolysis is usable without limitation irrespective of its production method. The iron powder to be used may be produced by once oxidizing iron and then reducing the oxidized iron. The metal compound is preferably an oxygen deficient metal compound. Examples of the oxygen deficient metal compound include cerium oxide ($CeO_2$), titanium oxide ($TiO_2$) and zinc oxide (ZnO) which are in an oxygen deficient state with their oxygen atoms extracted from their crystal lattices through reduction, and are reactive with oxygen in an atmosphere to exhibit an oxygen absorbing capability. These metals and metal compounds preferably contain metal halides or the like serving as a reaction accelerator.

Examples of the organic oxygen absorber include hydroxyl-containing compounds, quinone compounds, double bond-containing compounds and oxidizable resins, which contain hydroxyl groups and/or double bonds that are reactive with oxygen to absorb oxygen. Preferred examples of the organic oxygen absorber include ring-opened polymers such as polyoctenylenes obtained by ring-opening polymerization of cycloalkenes, and polymers of conjugated dienes such as butadiene and their cyclization products.

The composite oxygen absorber contains the transition metal catalyst and the organic compound in combination. The transition metal catalyst excites oxygen, and the organic compound reacts with the excited oxygen, whereby oxygen is absorbed. The composite oxygen absorber is a compound system such that the organic compound in the composite oxygen absorber reacts with oxygen more quickly than the product (food) packaged with the packaging material to thereby trap and absorb oxygen. Exemplary transition metals for the transition metal catalyst include titanium, vanadium, chromium, manganese, iron, cobalt, nickel, copper, zinc, zirconium, ruthenium and palladium, at least one of which is selected. Particularly, cobalt is preferred for compatibility with the resin, the catalyst functionality and the safety. Preferred examples of the organic compound include ring-opened polymers such as polyoctenylene obtained by ring-opening polymerization of cycloalkenes, and polymers of conjugated dienes such as butadiene and its cyclization product, which are organic oxygen absorbers. Other examples of the organic compound include nitrogen-containing resins such as MXD nylons, tertiary hydrogen-containing resins such as polypropylene, polyalkylene ether bond-containing resins such as block copolymers having a polyalkylene ether unit, and anthraquinone polymers.

In the composite oxygen absorber, the transition metal catalyst is present in a mass ratio of 0.0001 to 5 wt. %, preferably 0.0005 to 1 wt. %, more preferably 0.001 to 0.5 wt. %, on a metal element basis with respect to the mass of the organic compound.

The proportion of the oxygen absorber (E) is typically 1 to 30 wt. %, preferably 3 to 25 wt. %, more preferably 5 to 20 wt. %, based on the weight of the EVOH (A).

<Desiccant (F)>

For improvement of the gas barrier property after a hot water sterilization process (e.g., a boiling process and a retorting process), the inventive resin composition may contain a desiccant (F) in addition to the EVOH (A) (as desired, the other thermoplastic resin (C)), and the cinnamate (B).

In the present disclosure, generally known hygroscopic compounds and water-soluble desiccants are usable as the desiccant (F). For affinity for the EVOH (A), the water-soluble desiccants are particularly preferred, and hydrate-formable metal salts are more preferred.

Examples of the hygroscopic compounds include silica gel, bentonite, molecular sieve and highly water-absorbable resins, which may be used alone or in combination.

Examples of the water-soluble desiccants include sodium chloride, sodium nitrate, sugar, trilithium phosphate, sodium metaphosphate, sodium polyphosphate and hydrate-formable metal salts, which may be used alone or in combination.

A hydrate-formable metal salt to be used in the present disclosure is a metal salt capable of absorbing water as crystalline water, and its production method is not particularly limited. For example, a metal salt produced by synthesizing a hydrate of the metal salt and dehydrating the synthesized hydrate may be used. The metal salt is preferably a completely dehydrated metal salt (anhydride) for hygroscopic property, but may be a partially dehydrated metal salt (unsaturated hydrate).

Exemplary metals for the hydrate-formable metal salt include monovalent metals, divalent metals and trivalent metals. Examples of the monovalent metals include alkali metals such as sodium and potassium. Examples of the divalent metals include alkali earth metals such as beryllium, magnesium and calcium, and transition metals such as copper, zinc and iron capable of forming divalent ions. Examples of the trivalent metals include aluminum and iron. Of these metals, sodium and magnesium are preferred.

Exemplary acid moieties for the hydrate-formable metal salt include sulfuric acid, carboxylic acid, phosphoric acid, boric acid, nitric acid, carbonic acid and sulfurous acid, among which sulfuric acid, carboxylic acid and phosphoric acid are preferred.

Specific examples of the hydrate-formable metal salt include chlorides such as cobalt chloride, calcium chloride and magnesium chloride; phosphates such as dihydrogen sodium phosphate, hydrogen disodium phosphate, trisodium phosphate, sodium pyrophosphate and hydrogen calcium phosphate; carboxylates such as disodium succinate, sodium tartrate and trisodium citrate; and sulfates such as sodium sulfate, potassium sulfate and magnesium sulfate, among which sulfates are preferred and partially or completely dehydrated magnesium sulfate is particularly preferred for recovery of the gas barrier property after the retorting process.

The hydrate-formable metal salt is a dehydration product of a crystalline water-containing metal salt. Exemplary crystalline water-containing metal sulfates include: monovalent metal salts such as sodium sulfate ($Na_2SO_4.10H_2O$) and potassium sulfate ($K_2SO_4.1H_2O$); alkali earth metal salts such as beryllium sulfate ($BeSO_4.4H_2O$), magnesium sulfate ($MgSO_4.7H_2O$) and calcium sulfate ($CaSO_4.2H_2O$); transition metal salts such as copper sulfate ($CuSO_4.5H_2O$), zinc sulfate ($ZnSO_4.7H_2O$) and iron sulfate ($FeSO_4.7H_2O$); and aluminum sulfate ($Al_2(SO_4)_3.16H_2O$). Parenthesized chemical formulae respectively represent saturated hydrates of the metal sulfates.

The hydrate-formable metal salt may be a partially- or completely-dehydrated product of the saturated hydrate of the metal salt. The partially dehydrated product of the saturated hydrate of the metal salt is obtained by removing part of crystalline water from the saturated hydrate. Provided that the weight percentage of the crystalline water present in the saturated hydrate of the metal salt is 100%, the partially dehydrated product of the saturated hydrate of the metal salt is typically a hydrate of the metal salt having a crystalline water weight percentage of less than 90%. It is preferred to use a partially dehydrated product of the saturated hydrate of the metal salt having a feature such that the saturated hydrate is more stable than the partially dehydrated product at an ordinary temperature. Therefore, a partial hydrate of the metal salt dehydrated to a crystalline water weight percentage of less than 70% is preferably used. More preferably, a completely-dehydrated metal salt or a hydrate-formable metal salt having a crystalline water weight percentage of 0% is used.

The mixing weight ratio (F/A) of the desiccant (F) to the EVOH (A) is typically 50/50 to 1/99, preferably 30/70 to 1/99, more preferably 20/80 to 5/95, particularly preferably 15/85 to 5/95. Where the desiccant (F) is a partially dehydrated product of a crystalline water-containing metal salt, the mixing weight ratio (F/A) is determined by converting the weight of the partially dehydrated product to the weight of the completely-dehydrated product.

If the proportion of the desiccant (F) is excessively great, the resin composition tends to have poorer transparency, and a screen mesh of a forming machine is liable to be clogged due to agglomeration. If the proportion of the desiccant (F) is excessively small, the effect of the blending of the desiccant (F) for removing water from the EVOH (A) will be insufficient, so that the gas barrier property tends to be insufficient after the hot water sterilization process such as the boiling process and the retorting process.

<Other Additives (G)>

As required, the inventive resin composition may contain known additives in proper proportions (e.g., less than 5 wt. % based on the overall weight of the resin composition), as long as the effects of the present disclosure are not impaired. Examples of the additives include: an aliphatic polyalcohol plasticizer such as ethylene glycol, glycerin or hexanediol; a lubricant such as a saturated fatty acid amide (e.g., stearamide or the like), an unsaturated fatty acid amide (e.g., oleamide or the like), a bis-fatty acid amide (e.g., ethylene bisstearamide or the like) and a low-molecular-weight polyolefin (e.g., a low-molecular-weight polyethylene or a low-molecular-weight polypropylene having a molecular weight of about 500 to about 10000); an antiblocking agent; an antioxidant; a colorant; an antistatic agent; a UV absorber; an antibacterial agent; an insoluble inorganic salt (e.g., hydrotalcite or the like); a filler (e.g., an inorganic filler other than the aforementioned inorganic filler (D)); a surfactant and a wax; a dispersant (e.g., calcium stearate, stearic acid monoglyceride or the like); and a conjugated polyene compound.

The conjugated polyene compound is a compound containing so-called conjugated double bonds, i.e., having a structure such that carbon-carbon double bonds and carbon-carbon single bonds are alternately connected to each other and the number of the carbon-carbon double bonds is two or more. The conjugated polyene compound may be a conjugated diene having a structure such that two carbon-carbon double bonds and a single carbon-carbon single bond are alternately connected to each other, a conjugated triene having a structure such that three carbon-carbon double bonds and two carbon-carbon single bonds are alternately connected to each other, or a conjugated polyene compound having a structure such that more than three carbon-carbon double bonds and more than two carbon-carbon single bonds are alternately connected to each other. However, a conjugated polyene compound having eight or more conjugated carbon-carbon double bonds is colored, so that a product formed from a resin composition containing such a conjugated polyene compound is liable to be colored. Therefore, a conjugated polyene compound having seven or less conjugated carbon-carbon double bonds is preferred. The conjugated polyene compound may have a structure such that plural sets of conjugated double bonds each including two or more carbon-carbon double bonds are present in an unconjugated state in its molecule. Tung oil containing three conjugated trienes in its molecule is also an example of the conjugated polyene compound.

Specific examples of the conjugated polyene compound include: conjugated diene compounds, such as isoprene, myrcene, farnesene, cembrene, sorbic acid, sorbate and abietic acid, each containing two carbon-carbon double bonds; conjugated triene compounds, such as 1,3,5-hexatriene, 2,4,6-octatriene-1-carboxylic acid, eleostearic acid, tung oil and cholecalciferol, each containing three carbon-carbon double bonds; and conjugated polyene compounds, such as cyclooctatetraene, 2,4,6,8-decatetraene-1-carboxylic acid, retinol and retinoic acid, each containing four or more carbon-carbon double bonds. These conjugated polyene compounds may be used alone or in combination.

The proportion of the conjugated polyene compound is typically 0.000001 to 1 part by weight, preferably 0.00001 to 0.5 parts by weight, particularly preferably 0.0001 to 0.01 part by weight, based on 100 parts by weight of the EVOH (A).

The conjugated polyene compound is preferably preliminarily contained in the EVOH (A).

A base resin for the overall inventive resin composition is the EVOH (A). Therefore, the proportion of the EVOH (A) is typically not less than 70 wt. %, preferably not less than 80 wt. %, particularly preferably not less than 90 wt. %, based on the overall weight of the resin composition. If the proportion of the EVOH (A) is excessively great, the effects of the blending of the components (B), (C), (D), (E), (F) and (G) (which may be used in combination) tend to be reduced. If the proportion of the EVOH (A) is excessively small, the gas barrier property tends to be poorer.

<Preparation of Resin Composition>

The inventive resin composition may be prepared in the following manner by way of example but not by way of limitation. That is, the resin composition may be prepared by blending the EVOH (A) and the cinnamate (B) in predetermined proportions and melt-kneading the resulting mixture (melt-kneading method) or by dry-blending the EVOH (A) and the cinnamate (B) in predetermined proportions (dry-blending method).

Exemplary methods for the blending include: a method in which the components are dry-blended by means of a Banbury mixer or the like; and a method in which the components are melt-kneaded by means of a single screw extruder or a twin screw extruder and the resulting mixture is pelletized. A temperature for the melt-kneading is typically 150° C. to 300° C., preferably 170° C. to 250° C.

The inventive resin composition may be melt-formed into a product immediately after the preparation thereof by the melt-kneading of the ingredients. For industrial handling ease, the resin composition is preferably once formed into resin composition pellets after the melt-kneading, and then melt-formed into a product. From an economic viewpoint, a pelletization method is preferably employed in which the resin composition is melt-kneaded and extruded into strands by means of an extruder, and then the strands are cut into pellets.

Exemplary pellet shapes include a spherical shape, a cylindrical shape, a cubic shape and a rectangular columnar shape. Typically, the pellets are formed in a spherical shape (or a rugby ball-like shape) or a cylindrical shape. For convenience in using the pellets as a forming material, the spherical pellets typically each have a diameter of 1 to 6 mm and a height of 1 to 6 mm, preferably a diameter of 2 to 5 mm and a height of 2 to 5 mm. The cylindrical pellets typically each have a bottom diameter of 1 to 6 mm and a length of 1 to 6 mm, preferably a bottom diameter of 2 to 5 mm and a length of 2 to 5 mm.

For stable feeding of the resulting resin composition pellets in the melt-forming process, a lubricant is preferably applied on surfaces of the resin composition pellets. Examples of the lubricant include higher fatty acids (e.g., lauric acid, myristic acid, palmitic acid, behenic acid, oleic acid and the like), metal salts of the higher fatty acids (e.g., aluminum salts, calcium salts, zinc salts, magnesium salts, barium salts and the like of the higher fatty acids), esters of the higher fatty acids (e.g., methyl esters, isopropyl esters, butyl esters, octyl esters and the like of the higher fatty acids), amides of the higher fatty acids (e.g., saturated fatty acid amides such as stearamide and behenamide, unsaturated fatty acid amides such as oleamide and erucamide, and bis-fatty acid amides such as ethylenebisstearamide, ethylenebisoleamide, ethylenebiserucamide and ethylenebislauramide), low-molecular-weight polyolefins (e.g., low-molecular-weight polyethylenes and low-molecular-weight polypropylenes each having a molecular weight of about 500 to about 10000, and acid modification products of these low-molecular-weight polyolefins), higher alcohols, ester oligomers and fluorinated ethylene resins. At least one of the higher fatty acids and the metal salts of the higher fatty acids, the esters and the amides of the higher fatty acids is preferably used, and at least one of the metal salts of the higher fatty acids and the amides of the higher fatty acids is more preferably used.

The lubricant may be in any form, e.g., a solid form (a powdery form, a particulate form or a flake form), a semi-solid form, a liquid form, a paste form, a solution form or an emulsion form (an aqueous dispersion form). The lubricant in the emulsion form is preferred in order to efficiently prepare the resin composition pellets as intended by the present disclosure.

Exemplary methods for applying the lubricant on the surfaces of the resin composition pellets include: a method in which the lubricant is mixed with the resin composition pellets by means of a blender or the like for the application of the lubricant; a method in which the resin composition pellets are immersed in a solution or a dispersion of the lubricant for the application of the lubricant; and a method in which a solution or a dispersion of the lubricant is sprayed over the resin composition pellets for the application of the lubricant. Preferably, the resin composition pellets are fed into the blender or the like and, with stirring, the lubricant emulsion is gradually applied over the resin composition pellets at a rate of 0.001 to 1 part by weight/hour, more preferably 0.01 to 0.1 part by weight/hour, on a solid lubricant basis with respect to 100 parts by weight of the resin composition pellets for uniform application of the lubricant. An optimum method for allowing all the lubricant applied on the pellet surfaces to firmly adhere to the pellet surfaces without detachment of the lubricant in a melt-forming machine is to bring the lubricant into contact with the resin composition pellets at a temperature lower than the melting point of the EVOH (A) while maintaining the surfaces of the resin composition pellets at a higher temperature that is equal to or higher than the melting point of the lubricant minus 50° C.

The proportion of the lubricant is preferably 10 to 1000 ppm, more preferably 20 to 500 ppm, particularly preferably 50 to 250 ppm, based on the amount of the resin composition pellets for the stable feeding of the resin composition pellets in the melt-forming process.

<Melt-Formed Product>

The inventive resin composition is formed, for example, into a film and further into a cup and a bottle by a melt-forming method. Examples of the melt-forming method include an extrusion method (e.g., a T-die extrusion method, an inflation extrusion method, a blowing method, a melt-spinning method, a profile extrusion method or the like) and an injection molding method. The melt-forming temperature is properly selected typically from a range of 150° C. to 300° C.

In the present disclosure, the term "film" is intended to include "sheet" and "tape" without discrimination between the sheet and the tape.

The melt-formed product containing the inventive resin composition may be used as it is for various use applications. A layer of the resin composition (a film of the resin composition, if the film is formed as having a single layer structure) typically has a thickness of 1 to 5000 μm, preferably 5 to 4000 μm, particularly preferably 10 to 3000 μm.

The layer of the resin composition (the film of the resin composition, if the film is formed as having a single layer structure) contains the EVOH (A) and the cinnamate (B) in the predetermined proportions. The layer of the resin composition is a layer formed from the resin composition prepared in the aforementioned manner, typically, through the aforementioned melt-forming process. The proportion (ppm) of the cinnamate (B) in the resin composition is determined, for example, through quantitative analysis of the resin composition by a liquid chromatography/tandem mass spectrometry (LC/MS/MS).

<Determination of Proportion of Cinnamate (B)>

In the present disclosure, the proportion of the cinnamate (B) in the resin composition is determined by the following procedure by the liquid chromatography/tandem mass spectrometry (LC/MS/MS). The procedure will be described based on an exemplary case in which methyl cinnamate is used as the cinnamate (B). The procedure can also apply to a case in which a cinnamate other than methyl cinnamate is used.

[Preparation of Standard Solutions]

Methyl cinnamate (10.96 mg) is weighed in a 10-ml measuring flask, and dissolved in methanol. Thus, a 10-mL solution (standard stock solution having a concentration of 1096 μg/mL) is prepared. Then, mixed standard solutions having different concentrations (0.0110 μg/mL, 0.0219 μg/mL, 0.0548 μg/mL, 0.110 μg/mL and 0.219 μg/mL) are prepared by diluting the prepared standard stock solution with methanol. With the use of these mixed standard solutions, LC/MS/MS analysis is performed to form a calibration line.

[Preparation of Sample Solution]

(1) The inventive resin composition (1 g) is weighed in a 10-mL measuring flask, and then 9 mL of methanol is added to the measuring flask.

(2) The resulting mixture is subjected to an ultrasonic process for 120 minutes, and then cooled to a room temperature (25° C.).

(3) Methanol is further added to the solution to a volume of 10 mL (sample solution (I)).

(4) After 1 mL of the sample solution (I) is sampled in a 10-mL measuring flask, methanol is added to the sampled sample solution (I) to a volume of 10 mL (sample solution (II)).

(5) A liquid obtained by filtering the sample solution (I) or the sample solution (II) through a PTFE filter (0.45 μm) is used as a measurement solution, which is subjected to LC/MS/MS analysis.

The methyl cinnamate detection concentration is calculated from a peak area value detected by LC/MS/MS analysis based on the calibration line formed with the use of the standard solutions.

[LC/MS/MS Measurement Conditions]

LC system: LC-20A (available from Shimadzu Corporation)
Mass spectrometer: API4000 (AB/MDS Sciex)
Analytic column: Inertsil ODS-3 (2.1×150 mm, 5 μm)
Column temperature: 45° C.
Mobile phase: A 0.1 vol. % formic acid aqueous solution
B 0.1 vol. % methyl formate solution
Time program: 0.0→5.0 min. B %=30%→95%
5.0→10.0 min. B %=95%
10.1→15.0 min. B %=30%
Flow rate: 0.25 mL/min.
Valve switching: 9.0 to 12.0 min. and then to MS
Injection amount: 5 μL
Ionization: ESI method
Detection: Positive ion detection (SRM method)
Monitoring ion: Q1=163.0→Q3=130.8 (CE: 15 eV)

<Multilayer Structure>

The inventive multilayer structure includes at least one layer made of the inventive resin composition described above. The layer made of the inventive resin composition (hereinafter referred to simply as "resin composition layer") may be laminated with other base material to be thereby imparted with higher strength and additional functions.

A thermoplastic resin other than the EVOH (hereinafter referred to as "other thermoplastic resin" is preferably used as the base material.

Where the multilayer structure is configured to include layers a (a1, a2, . . . ) of the inventive resin composition and layers b (b1, b2, . . . ) of the other thermoplastic resin, possible combinations of the layers include a/b, b/a/b, a/b/a, a1/a2/b, a/b1/b2, b2/b1/a/b1/b2, b2/b1/a/b1/a/b1/b2 and the like. Where the multilayer structure is configured to include a recycle layer R obtained by recycling cutoff pieces and defective products occurring during the production of the multilayer structure and melt-forming the recycled material (a mixture including the inventive resin composition and the thermoplastic resin), possible combinations of these layers include b/R/a, b/R/a/b, b/R/a/R/b, b/a/R/a/b, b/R/a/R/a/R/b and the like. The total number of the layers of the multilayer structure is typically 2 to 15, preferably 3 to 10.

In the aforementioned layered configuration, an adhesive resin layer may be provided between the respective layers as required.

The layered configuration of the inventive multilayer structure preferably includes at least a basic stack unit as a structural unit. The basic stack unit includes the inventive resin composition layer provided as an intermediate layer, and outer layers of the other thermoplastic resin respectively provided on opposite sides of the intermediate layer (b/a/b or b/adhesive resin layer/a/adhesive resin layer/b).

Examples of the other thermoplastic resin include: (unmodified) polyolefin resins including polyethylene resins such as linear low-density polyethylenes, low-density polyethylenes, very-low-density polyethylenes, medium-density polyethylenes, high-density polyethylenes, ethylene-propylene (block and random) copolymers and ethylene-α-olefin (C4 to C20 α-olefin) copolymers, polypropylene resins such as polypropylenes and propylene-α-olefin (C4 to C20 α-olefin) copolymers, polybutenes, polypentenes and polycycloolefin resins (containing a cycloolefin structure at a main chain and/or a side chain); polyolefin resins in a broader sense including modified olefin resins such as unsaturated carboxyl-modified polyolefin resins obtained by graft-modifying any of the aforementioned polyolefins with an unsaturated carboxylic acid or an unsaturated carboxylate; ionomers, ethylene-vinyl acetate copolymers, ethylene-acrylic acid copolymers, ethylene-acrylate copolymers, polyester resins, polyamide resins (including polyamide copolymers), polyvinyl chlorides, polyvinylidene chlorides, acryl resins, polystyrene resins, vinyl ester resins, polyester elastomers, polyurethane elastomers, halogenated polyolefins such as chlorinated polyethylenes and chlorinated polypropylenes, and aromatic and aliphatic polyketones.

Of these thermoplastic resins, the polyamide resins, the polyolefin resins, the polyester resins and the polystyrene resins, which are hydrophobic resins, are preferred in consideration of hydrophobicity. The polyethylene resins, the polypropylene resins and the polycycloolefin resins, and the unsaturated carboxyl-modified polyolefin resins obtained by modifying these polyolefins are more preferred, and the polycycloolefin resins are particularly preferred as the hydrophobic resins.

A known adhesive resin may be used as a material for the adhesive resin layer. The adhesive resin to be used is properly selected according to the type of the other thermoplastic resin (base resin). Typical examples of the adhesive resin include carboxyl-containing modified polyolefin polymers prepared by chemically bonding an unsaturated carboxylic acid or its anhydride to a polyolefin resin by an addition reaction, a graft reaction or the like. Examples of the carboxyl-containing modified polyolefin polymers include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride, ethylene-vinyl acetate copolymers graft-modified with maleic anhydride, polycycloolefin resins modified with maleic anhydride and polyolefin resins graft-modified with maleic anhydride, which may be used alone or in combination.

The other thermoplastic resin (base resin) and the adhesive resin layer may contain a known plasticizer, a filler, clay (montmorillonite or the like), a colorant, an antioxidant, an antistatic agent, a lubricant, a nucleating agent, an antiblocking agent, a UV absorber, a wax and the like (e.g., in proportions of not greater than 30 wt. %, preferably not greater than 10 wt. %), as long as the effects of the present disclosure are not impaired.

Where the multilayer structure is produced by stacking the layer of the inventive resin composition and the layer of the other base material (other thermoplastic resin) optionally with the adhesive resin layer provided between the layers, a conventional stacking method may be employed. Examples of the stacking method include: a method in which a film or a sheet of the inventive resin composition is laminated with the other base material by melt extrusion; a method in which a film or a sheet of the other base material is laminated with the inventive resin composition by melt extrusion; a method in which the inventive resin composition and the other base material are coextruded; a method in which a film (layer) of the inventive resin composition and a film (layer) of the other base material are separately formed and bonded together by dry laminating with the use of a known adhesive agent such as of an organic titanium compound, an isocyanate compound, a polyester compound or a polyurethane compound; and a method in which a solution of the inventive resin composition is applied on the other base material layer and a solvent is removed from the applied solution. Of these methods, the coextrusion method is preferred in consideration of costs and environmental concerns.

The multilayer structure may be further subjected to a (heat) stretching process as required. The stretching process may be a uniaxial stretching process or a biaxial stretching process. The biaxial stretching process may be a simultaneous stretching process or a sequential stretching process. A roll drawing method, a tenter drawing method, a tubular drawing method, a draw blowing method or a vacuum pressure forming method having a higher draw ratio may be employed for the stretching process. A temperature for the drawing is typically selected from a range of 40° C. to 170° C., preferably about 60° C. to about 160° C. If the drawing temperature is excessively low, poorer drawability will result. If the drawing temperature is excessively high, it will be difficult to ensure stable drawing.

The resulting multilayer structure may be further subjected to a heat-setting process to ensure dimensional stability after the drawing. The heat-setting process may be performed in a known manner. For example, the drawn multilayer structure (drawn film) is typically heat-treated at 80° C. to 180° C., preferably 100° C. to 165° C., for about 2 to about 600 seconds, while being kept tense.

Where the drawn multilayer film produced by using the inventive resin composition is used as a shrinkable film, for example, the film is preferably cold-set so as to be imparted with a heat-shrinkable property by applying cold air over the drawn film without performing the above heat-setting process.

In some case, a cup-shaped or tray-shaped multilayer container may be produced from the inventive multilayer structure. An ordinary drawing process is employed for the production of the multilayer container. Specific examples of the drawing process include a vacuum forming method, a pressure forming method, a vacuum pressure forming method and a plug-assisted vacuum pressure forming method. Where a tube-shaped or bottle-shaped multilayer container is produced from a multilayer parison (a hollow tubular preform to be blown), a blow molding process is employed. Specific examples of the blow molding process include an extrusion blow molding method (a twin head type, a mold shift type, a parison shift type, a rotary type, an accumulator type, a horizontal parison type and the like), a cold parison blow molding method, an injection blow molding method and a biaxial stretching blow molding method (an extrusion type cold parison biaxial stretching blow molding method, an injection type cold parison biaxial stretching blow molding method, an injection inline type biaxial stretching blow molding method and the like). As required, the inventive multilayer structure may be subjected to a heating process, a cooling process, a rolling process, a printing process, a dry laminating process, a solution or melt coating process, a bag forming process, a deep drawing process, a box forming process, a tube forming process, a splitting process or the like.

The thickness of the inventive multilayer structure (or the drawn multilayer structure) and the thicknesses of the resin composition layer, the other thermoplastic resin layer and the adhesive resin layer of the multilayer structure are properly determined according to the layered configuration, the type of the thermoplastic resin, the type of the adhesive resin, and the use purpose, the package shape, the required physical properties and the like of the multilayer structure. Where the resin composition layer, the adhesive resin layer and/or the other thermoplastic resin layer each include two or more layers, the following thickness values each mean the total thickness of the two or more layers of the same type.

The thickness of the inventive multilayer structure (or the drawn multilayer structure) is typically 10 to 5000 μm, preferably 30 to 3000 μm, particularly preferably 50 to 2000 μm. If the overall thickness of the multilayer structure is excessively small, the gas barrier property is liable to be poorer. If the overall thickness of the multilayer structure is excessively great, the gas barrier property is liable to be excessive, and the ingredients are used wastefully to result in poor economy. The thickness of the resin composition layer is typically 1 to 500 μm, preferably 3 to 300 μm, particularly preferably 5 to 200 μm. The thickness of the other thermoplastic resin layer is typically 5 to 30000 μm, preferably 10 to 20000 μm, particularly preferably 20 to 10000 μm. The thickness of the adhesive resin layer is typically 0.5 to 250 μm, preferably 1 to 150 μm, particularly preferably 3 to 100 μm.

The thickness ratio between the resin composition layer and the other thermoplastic resin layer of the multilayer structure (resin composition layer/other thermoplastic resin layer) (if these layers each include a plurality of layers, the thickness ratio between the thickest one of the resin composition layers and the thickest one of the other thermoplastic resin layers) is typically 1/99 to 50/50, preferably 5/95 to 45/55, particularly preferably 10/90 to 40/60. The thickness ratio between the resin composition layer and the adhesive resin layer of the multilayer structure (resin composition layer/adhesive resin layer) (if these layers each include a plurality of layers, the thickness ratio between the thickest one of the resin composition layers and the thickest one of the adhesive resin layers) is typically 10/90 to 99/1, preferably 20/80 to 95/5, particularly preferably 50/50 to 90/10.

Bags, cups, trays, tubes, bottles and other containers and lids produced from the film or the drawn film formed in the aforementioned manner are useful as packaging material containers for general foods, condiments such as mayonnaise and dressing, fermented foods such as miso, fat and oil such as salad oil, beverages, cosmetics and medicines.

Particularly, the layer of the inventive resin composition is highly transparent and excellent in the absorbability of ultraviolet radiation of a specific wavelength range (e.g., the absorbability of UV-B and UV-C having a wavelength of shorter than 320 nm) and substantially free from the emanation of odor. Therefore, containers including the layer of the inventive resin composition are useful as containers for general foods, condiments such as mayonnaise and dressing, fermented foods such as miso, fat and oil such as salad oil, soup, beverages, cosmetics, medicines, detergents, perfumes, industrial chemicals, agricultural chemicals, fuels and the like. Particularly, useful examples of the containers including the layer of the inventive resin composition include: bottle-shaped and tube-shaped containers for semisolid foods and condiments such as mayonnaise, ketchup, sauce, miso, wasabi, mustard and barbecue sauce, and liquid beverages and condiments such as salad oil, mirin, sake, beer, wine, juice, tea, sports drink, mineral water and milk; cup-shaped containers for semisolid foods and condiments such as fruit, jelly, pudding, yogurt, mayonnaise, miso, processed rice, cooked foods and soup; and wide-mouthed containers and other packaging materials for raw meat, processed meat (ham, bacon, Vienna sausage and the like), cooked rice and pet food.

EXAMPLES

The present disclosure will hereinafter be described more specifically by way of examples thereof. However, it should be understood that the present disclosure be not limited to the examples within the scope of the present disclosure. It is noted that "parts" means "parts by weight" in the following examples.

Example 1

A saponified ethylene-vinyl acetate copolymer (EVOH (a1)) having an ethylene structural unit content of 29 mol %, a saponification degree of 99.6 mol %, an MFR of 8.8 g/10 minutes (at 210° C. with a load of 2160 g) was used as the EVOH (A). Methyl cinnamate (b1) available from Wako Pure Chemical Industries, Ltd. was used as the cinnamate (B).

Methyl cinnamate (b1) was dry-blended with 100 parts of the EVOH (a1) so as to have a concentration of 0.2 ppm. The resulting mixture was melt-kneaded at 50 rpm at 230° C. for 5 minutes by means of Brabender's PLASTOGRAPH. Thus, a resin composition was prepared. The proportion (ppm) of methyl cinnamate (b1) in the resin composition thus prepared was determined through quantitative analysis by the aforementioned liquid chromatography/tandem mass spectrometry (LC/MS/MS).

The resin composition thus prepared was heat-pressed into a single-layer film having a thickness of 60 μm at 230° C. by means of a compression press (NSF-37) available from Shinto Metal Industries Corporation.

The resulting film was evaluated for the following evaluation items (ultraviolet radiation transmittance, visible light transmittance, odor organoleptic test).

<Ultraviolet Radiation Transmittance (UV Absorbance)>

The UV transmittance (%) of the single-layer film at a wavelength of 300 nm (UV wavelength range) was measured by means of a spectrophotometer (UV2550) available from Shimadzu Corporation.

<Visible Light Transmittance (Transparency)>

The visible light transmittance (%) of the single-layer film at a wavelength of 500 nm (visible light wavelength range) was measured by means of a spectrophotometer (UV2550) available from Shimadzu Corporation.

<Odor Organoleptic Test (Odor Evaluation)>

A test sample for an organoleptic test was prepared by sealing 5 g of the single-layer film in a capped flask and allowing the capped flask to stand at 200° C. in a nitrogen atmosphere for 15 minutes. In the odor organoleptic test, seven panel members scored the test sample based on the following evaluation criteria, and the scores were averaged for the evaluation results. A higher score means a stronger odor. Particularly, a score 4 or higher means malodor.
0: Odorless
1: Slightly perceivable odor
2: Distinguishable weak odor
3: Easily perceivable odor
4: Strong odor (malodor)
5: Very strong odor (intensive malodor)

Example 2

A resin composition and a single-layer film were produced in substantially the same manner as in Example 1, except that the proportion of methyl cinnamate (b1) was 1 ppm based on the amount of the EVOH (a1). The single-layer film thus produced was evaluated in the same manner as in Example 1.

Example 3

A resin composition and a single-layer film were produced in substantially the same manner as in Example 1, except that the proportion of methyl cinnamate (b1) was 5 ppm based on the amount of the EVOH (a1). The single-layer film thus produced was evaluated in the same manner as in Example 1.

Example 4

A resin composition and a single-layer film were produced in substantially the same manner as in Example 2, except that ethyl cinnamate (b2) available from Aldrich Co., Ltd. was used instead of methyl cinnamate (b1). The single-layer film thus produced was evaluated in the same manner as in Example 2.

Example 5

A resin composition and a single-layer film were produced in substantially the same manner as in Example 2, except that n-propyl cinnamate (b3) available from Aldrich Co., Ltd. was used instead of methyl cinnamate (b1). The single-layer film thus produced was evaluated in the same manner as in Example 2.

Comparative Example 1

A resin composition and a single-layer film were produced in substantially the same manner as in Example 1, except that the proportion of methyl cinnamate (b1) was 20 ppm based on the amount of the EVOH (a1). The single-layer film thus produced was evaluated in the same manner as in Example 1.

Comparative Example 2

A resin composition and a single-layer film were produced in substantially the same manner as in Example 1, except that the proportion of methyl cinnamate (b1) was 160 ppm based on the amount of the EVOH (a1). The single-layer film thus produced was evaluated in the same manner as in Example 1.

Comparative Example 3

A resin composition and a single-layer film were produced in substantially the same manner as in Example 1, except that methyl cinnamate (b1) was not blended. The single-layer film thus produced was evaluated in the same manner as in Example 1.

Reference Example 1

A resin composition and a single-layer film were produced in substantially the same manner as in Example 2, except that a linear low-density polyethylene NOVATEC LL UF421 available from Japan Polyethylene Corporation was used instead of the EVOH (a1). The single-layer film thus produced was evaluated in the same manner as in Example 1.

Reference Example 2

A resin composition and a single-layer film were produced in substantially the same manner as in Reference Example 1, except that methyl cinnamate (b1) was not blended. The single-layer film thus produced was evaluated in the same manner as in Example 1.

The ingredients and the formulations of the resin compositions and the single-layer films thus produced and the results of the evaluation are shown in Table 1.

TABLE 1

|  | Resin component | Type of cinnamate (B) | Proportion (ppm) of cinnamate (B) | UV transmittance (%) | Visible light transmittance (%) | Odor Evaluation* |
| --- | --- | --- | --- | --- | --- | --- |
| Example 1 | EVOH (a1) | Methyl cinnamate (b1) | 0.2 | 31.8 | 80.1 | 2.6 |
| Example 2 | EVOH (a1) | Methyl cinnamate (b1) | 1 | 30.7 | 79.9 | 3.0 |
| Example 3 | EVOH (a1) | Methyl cinnamate (b1) | 5 | 29.8 | 79.8 | 3.1 |
| Example 4 | EVOH (a1) | Ethyl cinnamate (b2) | 1 | 31.1 | 78.1 | 3.0 |

TABLE 1-continued

| | Resin component | Type of cinnamate (B) | Proportion (ppm) of cinnamate (B) | UV transmittance (%) | Visible light transmittance (%) | Odor Evaluation* |
|---|---|---|---|---|---|---|
| Example 5 | EVOH (a1) | n-propyl cinnamate (b3) | 1 | 31.8 | 77.6 | 3.0 |
| Comparative Example 1 | EVOH (a1) | Methyl cinnamate (b1) | 20 | 23.9 | 77.2 | 4.2 |
| Comparative Example 2 | EVOH (a1) | Methyl cinnamate (b1) | 160 | 18.3 | 74.1 | 5.0 |
| Comparative Example 3 | EVOH (a1) | — | — | 47.7 | 80.9 | — |
| Reference Example 1 | Linear low-density polyethylene | Methyl cinnamate (b1) | 1 | 43.4 | 77.7 | 4.1 |
| Reference Example 2 | Linear low-density polyethylene | — | — | 47.1 | 79.8 | — |

*In Comparative Example 3 and Reference Example 2, the cinnamate (B) was not blended and, therefore, the odor organoleptic test was not performed.

The above results indicate that, in Examples in which the cinnamate (B) was blended in the predetermined proportion with the EVOH (a1), the resulting single-layer film was highly transparent with a higher visible light transmittance, and was capable of absorbing ultraviolet radiation of the specific ultraviolet wavelength range with a lower UV transmittance and effectively suppressing the emanation of odor with an odor evaluation score of less than 4.

In Comparative Examples 1 and 2 in which the cinnamate (B) was blended in a proportion greater than the predetermined proportion with the EVOH (a1), in contrast, the resulting single-layer film suffered from the so-called malodor with an odor evaluation score of higher than 4. In Reference Example 1 in which the linear low-density polyethylene was used instead of EVOH (a1) and the proportion of the cinnamate (B) was within the predetermined range, the resulting single-layer film had a higher UV transmittance than in Example 2, and suffered from the so-called malodor with an odor evaluation score of higher than 4.

While specific forms of the embodiment of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The inventive resin composition contains the EVOH (A) and the predetermined proportion of the cinnamate (B). The resin composition layer (e.g., film or the like) made of the resin composition is used as a film which is highly transparent, capable of absorbing ultraviolet radiation of a specific wavelength range (e.g., UV-B and UV-C having a wavelength shorter than 320 nm), and substantially free from the emanation of odor. Therefore, the film is particularly useful as a packaging material for foods.

The invention claimed is:

1. A resin composition comprising:
   (A) a saponified ethylene-vinyl ester copolymer; and
   (B) a cinnamic acid methyl ester;
      wherein the cinnamic acid methyl ester (B) is present in a proportion of 0.01 to 8 ppm based on an amount of the saponified ethylene-vinyl ester copolymer (A).

2. A film comprising the resin composition according to claim 1.

3. A multilayer structure comprising at least one resin composition layer comprising the resin composition according to claim 1.

4. The resin composition according to claim 1, wherein the saponified ethylene-vinyl ester copolymer (A) has an ethylene structural unit content of 20 to 60 mol %.

5. The resin composition according to claim 1, wherein a saponification degree of a vinyl ester in the saponified ethylene-vinyl ester copolymer (A) is 90 to 100 mol %.

6. The resin composition according to claim 1, wherein the saponified ethylene-vinyl ester copolymer (A) has a melt flow rate (MFR) of 0.5 to 100 g/10 minutes.

* * * * *